United States Patent [19]

Reekie et al.

[11] Patent Number: 5,615,970

[45] Date of Patent: *Apr. 1, 1997

[54] STRING TRIMMER HAVING KNOCK-DOWN HANDLE

[75] Inventors: George Reekie, North York; Jacob Prosper, Brockville; Sheldon Atos, Mallorytown; Colin Dyke, North Augusta, all of Canada

[73] Assignee: Black & Decker Inc., Newark, Del.

[ * ] Notice: The term of this patent shall not extend beyond the expiration date of Pat. No. 5,379,846.

[21] Appl. No.: 326,827

[22] Filed: Oct. 20, 1994

[51] Int. Cl.$^6$ ..................................................... B25G 3/26
[52] U.S. Cl. ........................... 403/379; 403/376; 403/13; 56/DIG. 18; 30/276
[58] Field of Search .................. 30/276, 347; 56/400.04, 56/400.19, DIG. 18; 172/15, 13; 403/13, 14, 379, 378, 377, 376

[56] References Cited

U.S. PATENT DOCUMENTS

| | | |
|---|---|---|
| D. 351,768 | 10/1994 | Griffin . |
| 367,578 | 8/1887 | Babb . |
| 1,867,226 | 7/1932 | Martin . |
| 2,230,703 | 2/1941 | Smellie . |
| 2,511,160 | 6/1950 | Grobowski . |
| 2,950,134 | 8/1960 | Strange . |
| 3,484,736 | 12/1969 | Wyse . |
| 3,569,903 | 3/1971 | Brishka . |
| 3,759,020 | 9/1973 | Simmons . |
| 3,803,819 | 4/1974 | Ehrlich . |
| 3,858,383 | 1/1975 | Glover . |
| 3,879,573 | 4/1975 | Ehrlich . |
| 3,886,716 | 6/1975 | Sellers . |
| 4,018,037 | 4/1977 | Weber . |
| 4,136,446 | 1/1979 | Tripp . |
| 4,156,312 | 5/1979 | Ballas, Sr. . |
| 4,156,967 | 6/1979 | Ballas, Sr. . |
| 4,211,004 | 7/1980 | Woods . |
| 4,364,435 | 12/1982 | Tuggle et al. . |
| 4,391,545 | 7/1983 | Zummer . |
| 4,397,088 | 8/1983 | Hampel . |
| 4,505,040 | 3/1985 | Everts . |
| 4,516,289 | 5/1985 | Sumerau . |
| 4,567,657 | 2/1986 | Krause . |
| 4,761,939 | 8/1988 | Zerrer . |
| 4,791,826 | 12/1988 | Behrens ............................... 403/379 X |
| 4,819,742 | 4/1989 | Driggers . |
| 4,829,675 | 5/1989 | Beihoffer . |
| 4,852,258 | 8/1989 | Foster . |
| 4,860,451 | 8/1989 | Pilatowicz et al. ........................ 30/276 |
| 4,904,827 | 2/1990 | Potter et al. . |
| 4,976,031 | 12/1990 | Miller . |
| 5,168,693 | 12/1992 | Ingvardsen . |
| 5,379,846 | 1/1995 | Wagster et al. . |

Primary Examiner—Anthony Knight
Attorney, Agent, or Firm—Harness, Dickey & Pierce, P.L.C.

[57] ABSTRACT

A string trimmer having a knock-down construction which enables the trimmer to be shipped in a partially disassembled condition and quickly assembled by an end user without the need for special tools and without the need for a large plurality of assembly steps. The string trimmer has a handle assembly having a coupling neck protruding therefrom and a base portion having a coupling neck protruding therefrom. An intermediate assembly has a coupling recess at each of its outermost ends which are adapted to snappingly engage with the coupling necks of the handle assembly and base assembly. Once coupled together, conventional threaded screws and nuts can be used to more permanently fasten the handle and base assemblies to the intermediate assembly. The interlocking coupling arrangements provide a high degree of resistance to twisting and bending forces and yet provide for quick and easy assembly of a new string trimmer by an end user with limited mechanical experience.

11 Claims, 4 Drawing Sheets

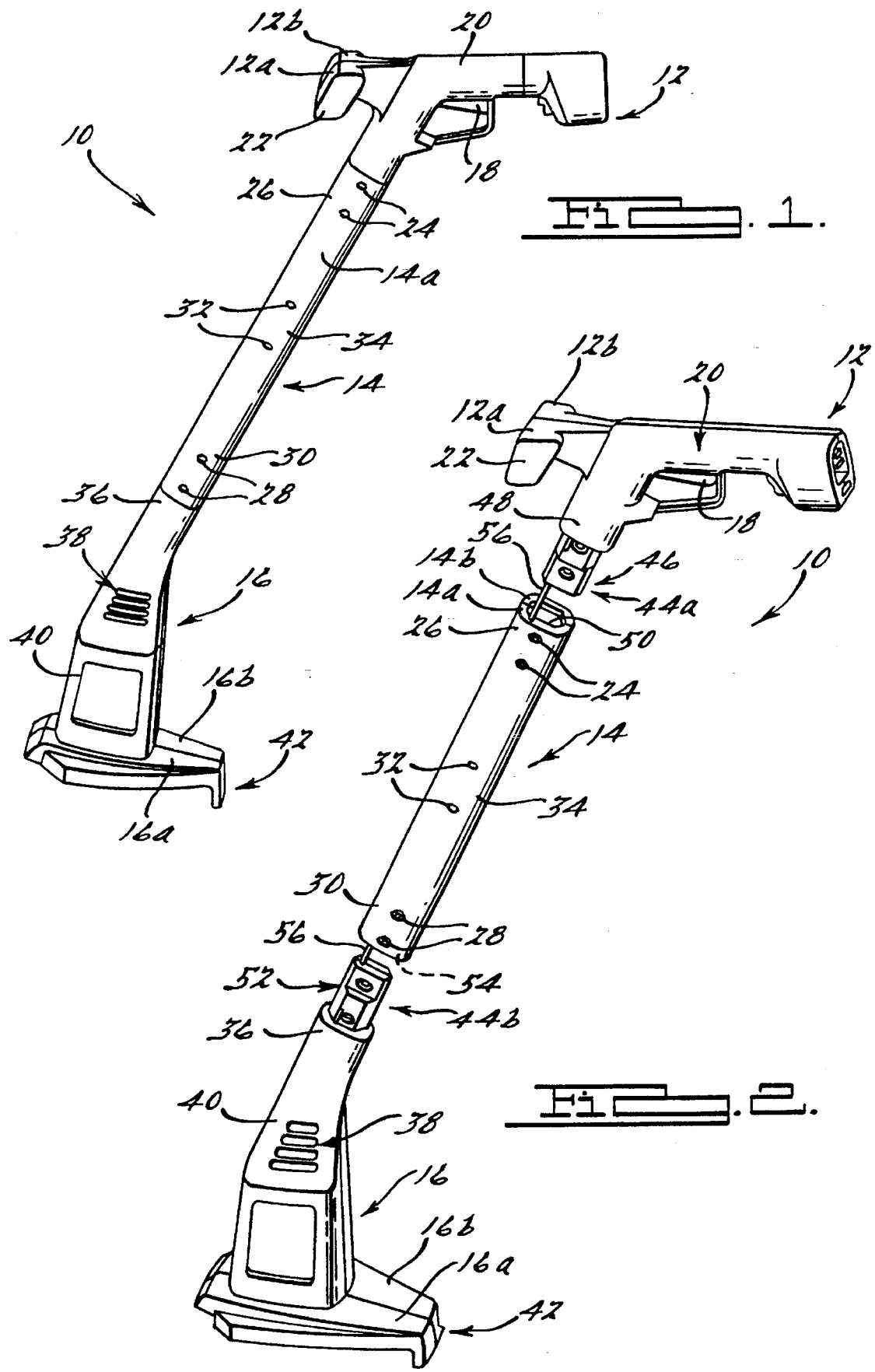

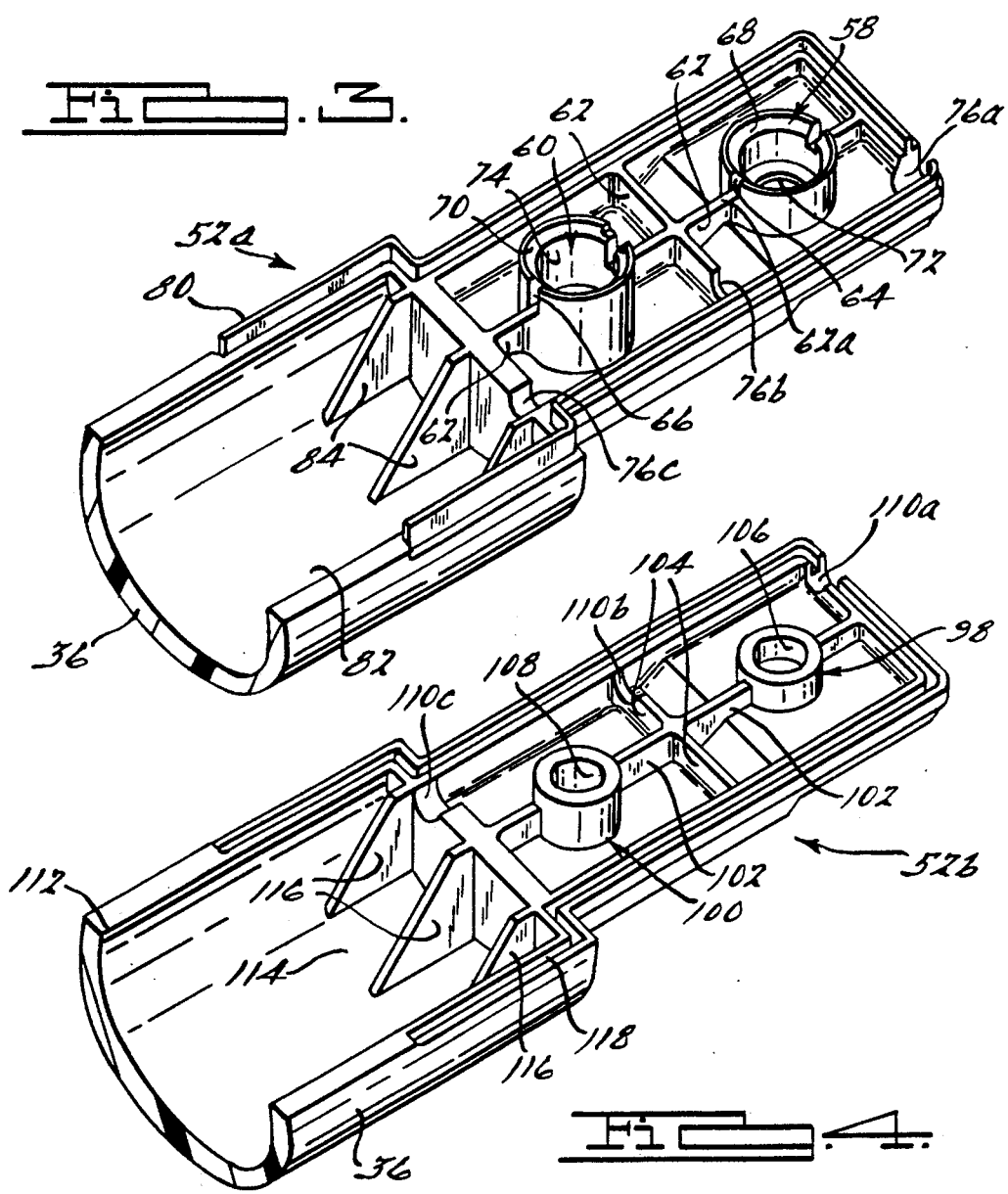
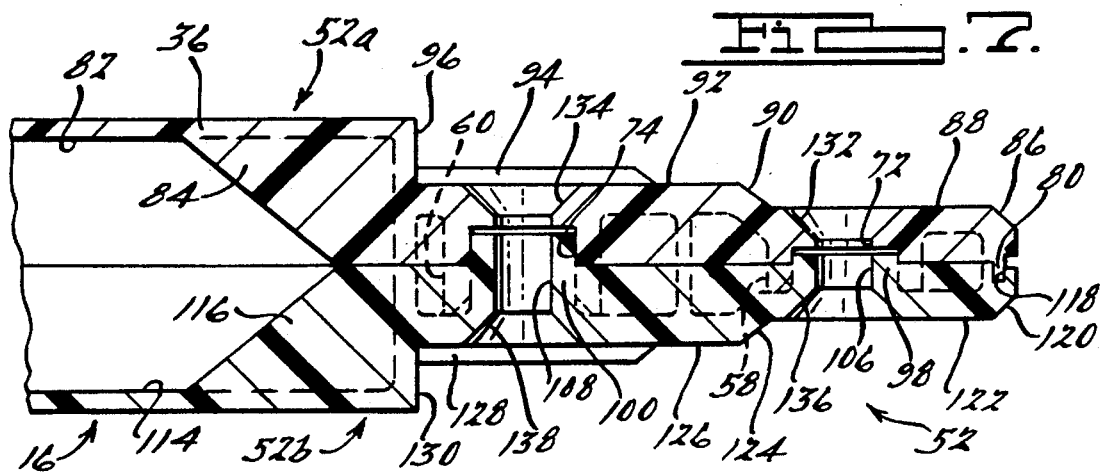

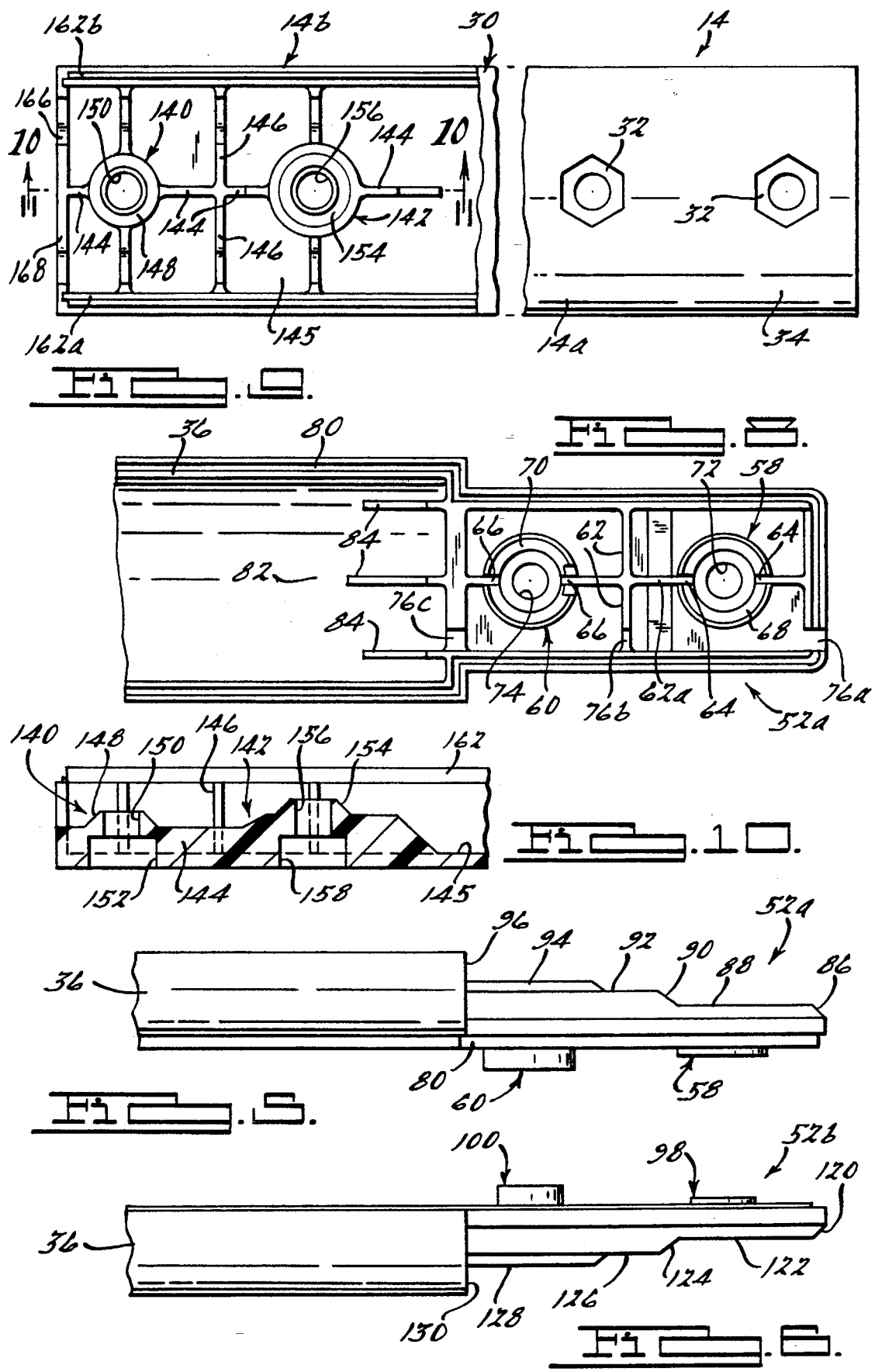

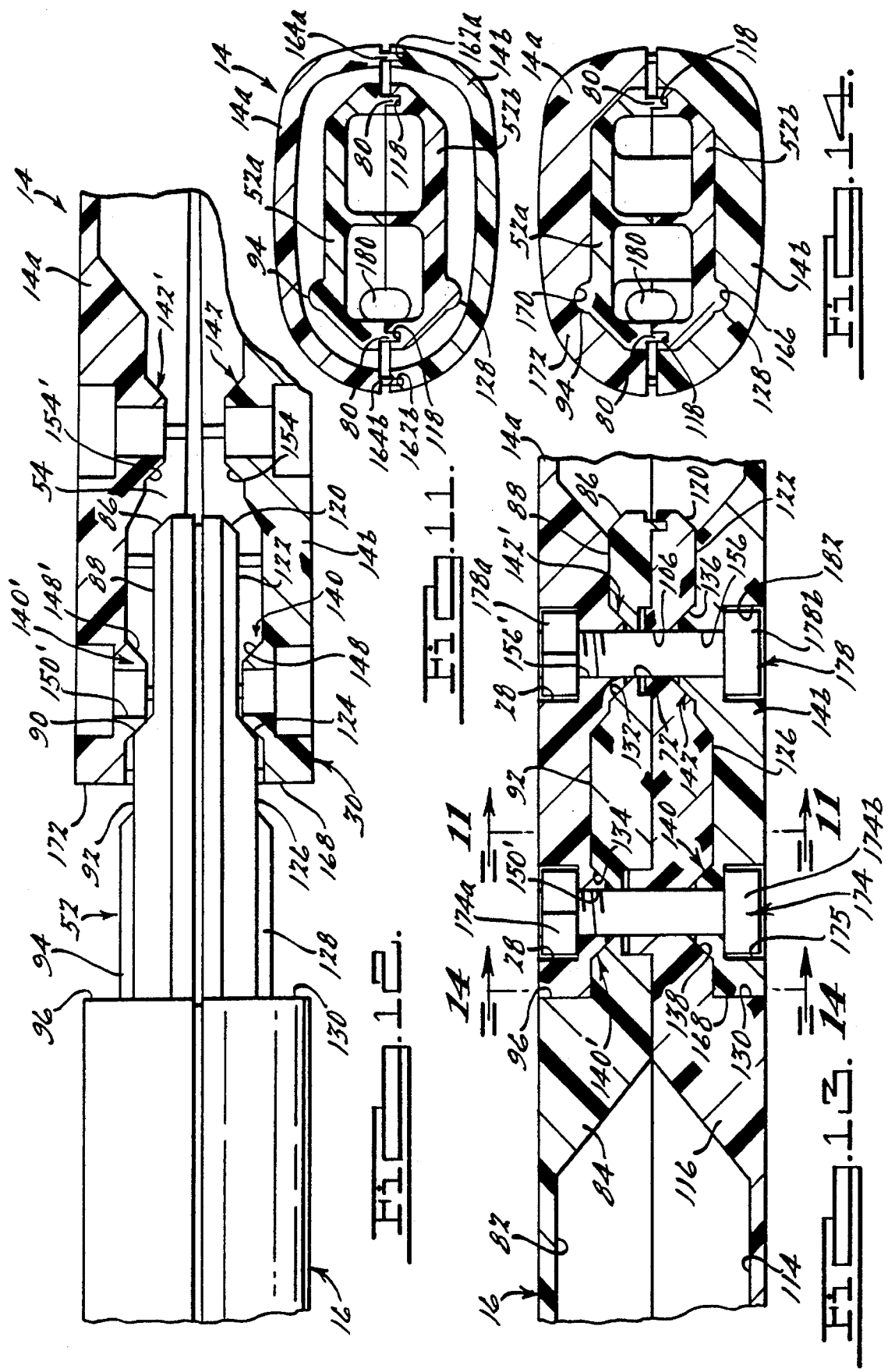

STRING TRIMMER HAVING KNOCK-DOWN HANDLE

CROSS-REFERENCE TO RELATED APPLICATIONS

The subject matter of the present application is related to U.S. patent application Ser. No. 29/030,023, filed Oct. 20, 1994, and entitled "Design: String Trimmer", assigned to the assignee of the present application;

U.S. patent application Ser. No. 08/326,730, filed Oct. 20, 1994, and entitled "Mounting Arrangement For A Line Cut-Off Blade For A String Trimmer", assigned to the assignee of the present application; and U.S. patent application Ser. No. 08/326,729, filed Oct. 20, 1994, and entitled "Multi-Purpose Motor Mounting System For A String Trimmer", assigned to the assignee of the present application.

BACKGROUND OF THE INVENTION

1. Technical Field

This invention relates to string trimmers, and more particularly to an electric string trimmer having a knock-down construction which enables the trimmer to be compactly configured for shipping while easily and quickly assembled by a user upon removal from a shipping container.

2. Discussion

Electric string trimmers have become popular in recent years as same have become more and more affordable to homeowners and other like individuals. Such string trimmers enable vegetation such as grass to be cut in areas such as along walls of houses, near fences and around shrubs and other like vegetation where access with a lawn mower is difficult or impossible. Electric string trimmers typically include a handle assembly which is graspable by the operator with at least one hand, an elongated neck portion having a length of usually in the range of about 2 feet–4 feet, and a base assembly at a lower end of the neck portion. Most typically, the neck portion is formed from a tubular section of material such as metal, and the handle assembly is clamped or otherwise secured thereto at a top end of the neck portion. The lower end of the neck portion is typically secured to the base assembly. The construction of the handle assembly and the base assembly is usually a two piece, clam shell-like form of construction which allows, for example, the handle assembly to be secured in two pieces over the upper end of the neck portion via one or more threaded screws. The base assembly is also typically of a two piece, clam shell-like construction which is assembled over the lower end of the neck portion and secured thereto via one or more threaded screws which extend through portions of the base assembly as well as the neck portion.

The above-described construction of most previously developed string trimmers, while resulting in a string trimmer which provides a solid feel, still has certain drawbacks. Since most string trimmers are usually completely assembled at a factory or other like point of manufacture, the string trimmer usually must be shipped in its completely assembled configuration. Since most string trimmers have a length of about 2 feet–4 feet, the containers which such string trimmers must be shipped in usually are quite large and, therefore, represent a significant component cost of the overall product. Furthermore, since the handle assembly of most prior-developed string trimmers protrudes somewhat transversely from the neck portion, the shipping container for the assembled trimmer must not only be rather long (i.e., usually about 3 feet–4 feet), but also must be relatively large in volume to allow the fully assembled trimmer to fit inside.

With most prior developed string trimmers, the overall complexity of manufacture and assembly is such that the end user, who may be an individual with very limited mechanical experience or understanding, is usually not in a position to perform significant assembly of a new string trimmer prior to first using the trimmer. Such individuals may also lack certain tools that may be required for significant assembly operations. For at least these reasons, it is not practical to expect most users of string trimmers to successfully assemble the trimmer quickly and easily from a large number of individual component parts with a limited amount of effort immediately after purchasing the trimmer.

Accordingly, it would be highly desirable to provide an electric string trimmer having a construction which allows it to be shipped while in a "knocked-down" configuration such that the complete string trimmer may be shipped in an extremely compact container, box or the like. By reducing the dimensions of the container or box required to package the trimmer, the overall cost of the trimmer can be reduced. With relatively inexpensive electric string trimmers, this savings could represent a significant reduction in the manufacturing cost of the overall product.

It would further be highly desirable to provide an electric string trimmer having a knock-down configuration which allows it to be shipped in a very compact container (i.e., box), and yet quickly and easily assembled by an individual with very limited mechanical experience and without the need for any special tools, and further in a matter of minutes after first removing the new knocked-down string trimmer from its packaging.

It is therefore a principal object of the present invention to provide a string trimmer which is formed in a small plurality of major component parts which may be quickly and easily assembled by the user without the need for special tools, just prior to first using the string trimmer.

It is another object of the present invention to provide a string trimmer having a knock-down configuration which allows it to be shipped in a very compact box or shipping carton, thus reducing the overall cost of production of the product and its cost of retail sale, and yet quickly, easily and efficiently assembled by an individual without the need for specialized mechanical understanding, lengthy instructions, or specialized tools.

It is still another object of the present invention to provide a string trimmer which has an independent handle assembly, an independent neck portion and an independent base assembly, where the neck portion is quickly, snappingly engageable with a portion of the handle assembly and also with a portion of the base assembly to form the assembled string trimmer without the need for any special tools or extensive assembly operations on the part of the user.

SUMMARY OF THE INVENTION

The above and other objects are provided by a string trimmer having a knock-down handle in accordance with a preferred embodiment of the present invention. The string trimmer of the present invention includes a handle assembly, an intermediate assembly (i.e., neck portion) and a base assembly. A lower portion of the handle assembly includes structure which is matingly engageable with an upper end portion of the intermediate assembly. The base assembly includes an upper portion having structure which is likewise matingly engageable with a lower end portion of the intermediate assembly. The intermediate assembly is further snappingly engageable with the lower portion of the handle assembly and the upper portion of the base assembly such that the entire string trimmer apparatus may be assembled by an individual with limited mechanical experience and without the need for special tools in a small number of quick and easy to perform steps. The knock-down configuration and design of the string trimmer apparatus of the present invention further allows the string trimmer apparatus to be shipped while in its knocked-down configuration, therefore permitting shipping boxes of significantly reduced dimensions to be used to contain and ship the string trimmer apparatus. In this manner, a significant manufacturing cost savings is realized in the overall production of the string trimmer apparatus.

In a preferred embodiment of the present invention, the lower portion of the handle assembly includes a coupling neck, while the upper end portion of the intermediate assembly includes a coupling recess adapted to matingly engage with the coupling neck in a manner which allows the coupling neck of the handle assembly to be snappingly engaged within the coupling recess and held therein. The lower end portion of the intermediate assembly includes an identically formed coupling recess, while the base assembly includes a coupling neck which is identical in configuration to the coupling neck of the handle assembly. Accordingly, the lower end portion of the intermediate assembly can be coupled to the base assembly by merely inserting the coupling neck of the base assembly into the coupling recess in the lower end portion of the intermediate assembly, thereby causing the coupling neck to snappingly engage within the lower end portion of the intermediate assembly. In this manner, the base assembly can be quickly and easily preliminarily secured to the lower end portion of the intermediate assembly prior to more permanently securing these two assemblies with threaded screws or other like fasteners. The coupling necks of the handle assembly and base assembly, as well as the intermediate assembly and its coupling recesses formed at opposing ends thereof, thus enable an entire string trimmer unit to be quickly and easily assembled in just a few easy steps by an individual with limited mechanical experience and without the need for special tools.

In a preferred embodiment the intermediate assembly includes a plurality of openings which accept conventional threaded fasteners to more permanently secure the handle assembly and base assembly to the upper and lower ends, respectively. Since virtually all of the interior components of the handle assembly in the base assembly remain within these assemblies, there is further little risk that the operator may inadvertently damage or otherwise upset one or more component parts within each of these assemblies necessary for the proper operation of the string trimmer apparatus.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of a string trimmer in accordance with a preferred embodiment of the present invention;

FIG. 2 is an exploded perspective view of the string trimmer of FIG. 1 showing the handle assembly, intermediate assembly and the base assembly disconnected from one another;

FIG. 3 is a perspective view of a portion of the base assembly showing the construction of the interior of one-half of the coupling neck of the base assembly;

FIG. 4 is a perspective view of the mating one-half coupling neck of the base assembly which, together with the coupling neck half shown in FIG. 3, forms the complete coupling neck of the base assembly;

FIG. 5 is a side elevational view of the coupling neck half of FIG. 3;

FIG. 6 is a side elevational view of the coupling neck half of FIG. 4;

FIG. 7 is a cross-sectional side view of the assembled coupling neck of the base unit showing how the two neck halves interlock together to form a rigid coupling neck;

FIG. 8 is a plan view of the coupling neck half of FIG. 3;

FIG. 9 is a broken away view of one of the coupling recesses in the intermediate assembly showing its interior structure;

FIG. 10 is a side cross-sectional view of the exposed coupling recess of FIG. 9 in accordance with section line 10—10 in FIG. 9;

FIG. 11 is a cross-sectional view of the coupling neck of FIG. 12 engaged within the coupling recess shown in FIG. 12, as taken in accordance with section line 11—11 in FIG. 12;

FIG. 12 is a view of the coupling neck of the base assembly being inserted in the coupling recess in the lower end portion of the intermediate assembly of the string trimmer;

FIG. 13 is a side cross-sectional view of the coupling neck shown in FIG. 12 completely inserted into the coupling recess shown in FIG. 12 with a pair of threaded fasteners and nuts being used to even more positively interlock the coupling neck within the coupling recess; and FIG. 14 is a cross-sectional view of the coupling neck interlocked within the coupling recess in accordance with section line 14—14 of FIG. 13.

DETAILED DESCRIPTION OF THE PREFERRED EMBODIMENTS

Referring to FIG. 1, there is shown a string trimmer 10 in accordance with a preferred embodiment of the present invention. The string trimmer 10 generally includes a handle assembly 12, an intermediate assembly or neck portion 14 and a base assembly 16. The handle assembly 12 is further formed in a two piece, clam shell-like construction incorporating halves 12a and 12b which, when assembled, fit together to form the handle assembly 12 and to enclose therein internal component parts standard to a conventional string trimmer. The base assembly 16 likewise includes halves 16a and 16b which fit together when assembled to form a rigid assembly. The intermediate assembly or neck portion 14 is similarly formed from two halves 14a and 14b (shown in FIG. 2) which when assembled together form a rigid component.

The handle assembly 12 includes a trigger 18 which is manually engageable with the finger of one hand, while the same hand grasps a handle portion 20. The trigger 18 is used to control on/off operation of a motor (not shown) enclosed within the base assembly 16 which drives a conventional cutting line rotationally relative to the base assembly 16. The handle assembly 12 further includes a grippable support portion 22 which may be grasped with the other hand of the individual to allow the operator to easily and conveniently maneuver the trimmer apparatus 10 during use.

With further reference to FIG. 1, the intermediate assembly 14 includes a plurality of recesses 24 disposed at an upper end portion 26 thereof and a pair of recesses 28 formed in a lower end portion 30 thereof. A third pair of recesses 32 are formed at a center portion 34 of the intermediate assembly 14. The recesses 24 and 28 accept threaded nuts which allow the two intermediate half members 14a and 14b to be secured together via a pair of bolts which extend through each intermediate half 14a and 14b once the members 14a and 14b are fitted together. In this regard, it will be appreciated that the intermediate assembly 14 may be secured together at its center portion 34 prior to being packaged in a shipping container and shipped for wholesale or retail sale. Thus, during assembly by the operator, the operator does not need to assemble the intermediate assembly 14, but rather merely secure the handle assembly 12 and the base assembly 16 to the intermediate assembly 14. This feature of the present invention will be described in greater detail in the following paragraphs.

With further reference to FIG. 1, the base assembly 16 includes an upper portion 36, a plurality of slots 38 for allowing airflow into and through the interior of the base assembly 16, a motor housing portion 40 and a uniquely shaped guard 42. The upper portion 36, motor housing portion 40 and guard 42 are integrally formed such that the base assembly is formed by securing the two base assembly halves 16a and 16b together via conventional threaded screws.

Referring now to FIG. 2, the string trimmer 10 can be seen incorporating a pair of coupling assemblies 44a and 44b in accordance with a preferred embodiment of the present invention. The coupling assembly 44a comprises a coupling neck 46 which protrudes from a lower portion 48 of the handle assembly 20 and a coupling recess 50 which is formed at the upper end portion 26 of the intermediate assembly 14. The coupling assembly 44b includes a coupling neck 52 which is formed at the upper portion 36 of the base assembly 16 and a coupling recess 54 which is formed at the lower end portion 30 of the intermediate assembly 34. It will be appreciated that the coupling assemblies 44a and 44b are essentially identical. By incorporating two such coupling assemblies 44a and 44b, the string trimmer 10 forms an assembly having three major component sections (i.e., handle assembly 20, intermediate assembly 34 and base assembly 16) which may be "knocked-down" prior to shipping of the string trimmer 10. This enables the string trimmer 10 to be packaged in substantially smaller and more compact shipping containers than would otherwise be required if the string trimmer 10 had to be shipped in fully assembled form. By allowing the string trimmer 10 to be shipped in a "knock-down" configuration, a tangible manufacturing cost savings is realized through the use of smaller, more compact containers and packaging materials.

With further brief reference to FIG. 2, when the string trimmer 10 is first removed from its packaging or shipping container by the user, the string trimmer 10 is in disassembled form. The handle assembly 20 and base portion 16 are only connected, at this point, by an electrical cable 56 which electrically couples a motor positioned within the base assembly 16 with the trigger 18 of the handle assembly 20. As will be described in greater detail momentarily, the only assembly required of the user for a newly purchased string trimmer 10 is to insert the coupling neck 46 of the handle assembly 20 into the coupling recess 50 and the coupling neck 52 of the base assembly 16 into the coupling recess 54. Conventional bolts and threaded fasteners are then used at recesses 24 and 28 to permanently lock the handle assembly 20 and base assembly 16 to the intermediate assembly 14. Accordingly, there are no electrical wiring steps which need to be performed by the end user during assembly of the string trimmer 10. The complete assembly of the string trimmer 10 comprises essentially the three above-described steps.

Referring now to FIGS. 3–7, the construction of the coupling assembly 44b will be described. With initial references to FIGS. 3 and 4, the coupling neck 52 is formed from two mating neck halves 52a (FIG. 3) and 52b (FIG. 4). Neck half 52a, it should be appreciated, is integrally formed with housing half 16a. Neck half 52b is similarly integrally formed with housing half 16b. When the two housing halves 16a and 16b are assembled together prior to shipment of the string trimmer 10, the assembled coupling neck 52 (FIG. 7) is formed.

With specific reference to FIG. 3, the neck half 52a includes a forward boss 58 and a rearward boss 60 which are integrally formed with the neck half 52a. The forward and rearward bosses 58 and 60 are further structurally reinforced by support ribs 62. The forward boss 58 includes a pair of slots 64 formed therein, while the rearward boss 60 similarly includes a pair of slots 66 formed therein. Each of the slots 64 and 66 has a depth which extends down to an upper surface 62a of the ribs 62.

With further reference to FIG. 3, the forward boss 58 includes a bevelled inner edge portion 68 and the rearward boss 60 includes a bevelled inner edge portion 70. The forward boss 58 further includes a bore 72 and the rearward boss 60 includes a bore 74. A plurality of semi-circular notches 76a, 76b and 76c are formed in general longitudinal alignment with one another to help allow the electrical cable 56 (FIG. 2) to pass through the coupling neck 52 when the latter is fully assembled. An upstanding shoulder portion 80 further extends about the perimeter of substantially the entire neck half 52a with the exception of a break where the semi-circular notch 76a is formed. A recess 82 and a plurality of support ribs 84 are also formed to help impart structural rigidity to the neck half 52a.

With brief reference to FIG. 5, the neck half 52a can be seen to include a sloped edge portion 86, a forward outer surface 88, a sloped portion 90, a rearward outer surface 92 and a protruding alignment rib 94. From FIG. 5 it is also apparent that the rearward boss 60 protrudes outwardly from the upstanding shoulder portion 80 a greater degree than does the forward boss 58.

Referring now to FIG. 4, the neck half 52b is shown. The neck half 52b is very similar to the neck half 52a in construction and includes a forward boss 98 and a rearward boss 100. The bosses 98 and 100 are structurally reinforced by reinforcing ribs 102 and 104 integrally formed with the neck half 52b. The forward boss 98 further includes a bore 106 and the rearward boss 100 includes a bore 108. The bosses 98 and 100 are further spaced apart so as to align with and be insertable partially into the bosses 58 and 60 (FIG. 3) when the two neck halves 52a and 52b are assembled together.

With further reference to FIG. 4, the neck half 52b includes a series of semi-circular notches 110a, 110b and 110c which are in longitudinal alignment with one another. The notches 110a, 110b and 110c align with the notches 76a, 76b and 76c of the neck half 52a to form openings through which the electrical cable 56 extends when the two neck halves 52a and 52b are assembled together. The neck half 52b further includes a recess 114 and a plurality of support ribs 116 which impart structural rigidity to the neck half 52b to further resist twisting and bending forces encountered during use of the string trimmer 10. Lastly, a groove 118 is formed about substantially the entire periphery of the neck half 52b (with the exception of the notch 110a). The groove 118 receives the protruding shoulder portion 80 of the neck half 52a therein when the two neck halves 52a and 52b are assembled together to securely interlock the two halves and even further help to impart structural rigidity to the assembled coupling neck 52.

With reference now to FIG. 6, it can be seen that the neck half 52b includes a sloped edge portion 120, a forward outer surface 122, a sloped portion 124, a rearward outer surface 126, an alignment rib 128 and a wall portion 130. It can also be seen that the rearward boss 100 extends outwardly a greater distance than the forward boss 98.

Referring now to FIGS. 3, 4 and 7, the assembled coupling neck 52 is shown. When assembled, the forward boss 98 of neck half 52b engages within the forward boss 58 of the neck half 52a. The rearward boss 100 of the neck half 52b engages within the rearward boss 60 of the neck half 52a. The slots 64 and 66 in the bosses 58 and 60 of the neck half 52a further allow a portion of the reinforcing ribs 102 to engage therein. The upstanding shoulder portion 80 of the neck half 52a can also be seen engaged within the groove 118 in the neck half 52b. The interlocking of the support ribs 102 within the slots 64 and 66, as well as the interlocking of the upstanding shoulder portion 80 in the groove 118, further serves to "interlock" the two neck halves 52a and 52b together to form an assembly which is extremely resistant to twisting and bending forces experienced by the coupling neck 52.

With further brief reference to FIG. 7, the neck half 52a includes a forward countersunk portion 132 coaxially aligned with the bore 72 and a rearward countersunk portion 134 coaxially aligned with the bore 74. The neck half 52b includes a forward countersunk portion 136 coaxially aligned with the bore 106 and a rearward countersunk portion 138 coaxially aligned with the bore 108. Thus, when the two neck halves 52a and 52b are assembled as shown in FIG. 7, the bores 72 and 106 form a single longitudinal bore through which a bolt may be inserted during a final assembly step of the string trimmer 10. Similarly, the bores 74 and 108 form a longitudinal bore through which a second bolt may be inserted during the final assembly step of the string trimmer 10.

Referring now to FIGS. 9 and 10, the construction of the coupling recess 54 formed at the lower end portion 30 of the intermediate assembly 14 of the string trimmer 10 will be described. With initial reference to FIG. 9, a portion of the half 14a of the intermediate assembly 14 has been broken-away to reveal the internal structure of the half member 14b at the lower end portion 30 of the intermediate assembly 34. It will be appreciated immediately that the interior structure of the intermediate half member 14a is a virtually mirror image of that shown in FIG. 9.

With specific reference to FIG. 9, the intermediate half member 14b includes a forward boss 140 and a rearward boss 142. The forward and rearward bosses 140 and 142, respectively, are interconnected via reinforcing ribs 144 protruding from an interior surface 145 of the member 14b. Reinforcing ribs 146 impart further structural rigidity to this portion of the intermediate half member 14b.

With further reference to FIGS. 9 and 10, the forward boss 140 includes a sloped portion 148, a bore 150 and a countersunk portion 152 (FIG. 10). The rearward boss 142 includes a sloped wall portion 154, a bore 156 and a countersunk portion 158 (FIG. 10). The rearward boss 142 extends upwardly from the interior surface 145 a greater distance than does the forward boss 140. The significance of this feature will be described momentarily. With specific reference to FIG. 9, grooves 162a and 162b extend generally longitudinally along a partial length of the intermediate half member 14b.

With brief reference to FIG. 11, the intermediate housing half member 14a includes ribs 164a and 164b which interlock with the grooves 162a and 162b, respectively, when the intermediate housing half members 14a and 14b are coupled together. This interlocking adds a further degree of resistance to twisting and bending forces which could be experienced at the coupling assemblies 44a and 44b during use of the string trimmer 10. With further brief reference to FIG. 9, the intermediate half member 14b includes a groove 166 which is formed in a front edge portion 168. The groove 166 allows the alignment rib 128 (shown in FIGS. 7, 11 and 14) of the coupling neck 52 to fit therein when the coupling neck 52 is inserted into the coupling recess 54 during assembly by the user.

With brief reference to FIG. 14, the intermediate half member 14a also includes a groove 170 formed in a front edge portion 172 so as to be positioned laterally across from the groove 166. The groove 170 accepts the alignment rib 94 when the assembled coupling neck 52 is inserted within the coupling recess 54. Thus, the grooves 170 and 166, together with the alignment ribs 94 and 128, help to "key" the coupling neck 52 to the coupling recess 54 such that the coupling neck 52 can only be inserted into the coupling recess 54 in one orientation. It will be appreciated that while the preferred embodiments described herein are shown to incorporate two alignment ribs 94 and 128, each of the coupling assemblies 44a and 44b would work equally well if only a single alignment rib is incorporated. Incorporating two alignment ribs, however, adds an even further degree of structural rigidity to each of the coupling assemblies 44a and 44b.

Referring now to FIGS. 12–14, the assembly of the coupling neck 52 and the coupling recess 54 together will be described. With specific reference to FIG. 12, when the coupling neck 52 of the base assembly 16 is inserted into the coupling recess 54 the sloped edge portion 120 contacts the sloped wall portion 148 of the forward boss 140, and the sloped edge portion 86 contacts a sloped wall portion 148' of a forward boss 140' of the half member 14a. As the coupling neck 52 is further urged into the coupling recess 54 the sloped edge portions 120 and 86 urge the intermediate half members 14a and 14b slightly apart as the forward outer surfaces 122 and 88 begin to pass over the forward bosses 140 and 140'. Since the intermediate half members 14a and 14b are secured at the central portion of the intermediate assembly 14, the two half members 14a and 14b will not separate, but rather will "flex" apart just slightly as the forward bosses 140 and 140' begin to ride over the forward outer surfaces 122 and 88, respectively.

As the coupling neck 52 is further urged into the coupling recess 54, the sloped portions 124 and 90 contact the sloped wall portion 148 of the forward boss 140 and the sloped wall portion 148' of the forward boss 140' of the intermediate half member 14a. The intermediate half members 14a and 14b are urged outwardly and spread apart slightly further as the coupling neck 52 is further urged into the coupling recess 54.

Further insertion of the coupling neck 54 causes the forward bosses 140 and 140' to begin riding over the rearward outer surfaces 126 and 92, respectively, as the intermediate half members 14a and 14b are caused to be gradually spread apart even further.

Referring now to FIG. 13, as the coupling neck 52 becomes fully inserted into the coupling recess 54, the forward bosses 140 and 140' "snap" into the countersunk portions 138 and 134 of the neck halves 52b and 52a, respectively. Substantially simultaneously, the rearward boss 142 of the intermediate half member 14b and a corresponding rearward boss 142' of the intermediate half member 14a "snap" into engagement with the countersunk portions 136 and 132, respectively, of the coupling neck 52. At this point the outer edge portion 168 of the intermediate half member 14b and the front edge surface 172 of the intermediate half member 14a abuttingly engage the wall portions 130 and 96, respectively. After the forward bosses 140 and 140' begin riding over the rearward outer surfaces 126 and 92, and just prior to snapping engagement of the forward bosses 140 and 140', the alignment ribs 94 and 128 slidably enter the grooves 170 and 166. The sloped wall portion 154 of the rearward boss 142 and the sloped wall portion 145' of the rearward boss 142' snappingly engage within the countersunk portions 136 and 132, respectively, of the coupling neck 52, once the coupling neck 52 is fully inserted in the coupling recess 54. The interlocking of the alignment ribs 94 and 128 with the grooves 170 and 166, respectively, is seen particularly well in FIG. 14.

FIG. 13 shows the final steps in assembling the string trimmer. A threaded bolt 174 is inserted through the bore 150, the bore 108, the bore 74 and a bore 150' of the intermediate half member 14a. A threaded nut 174a is inserted within a first one of the recesses 28 in the intermediate half member 14a while a head portion 174b of the threaded bolt 174a is placed within a recesses 175 in the intermediate half member 14b, to threadably engage the threaded bolt 174. Another threaded bolt 178 is inserted through the bore 156, the bore 106, the bore 72 and a bore 156'. A threaded nut 178a is inserted within the other one of the recesses 28 while a head portion 178b is placed within a recess 182. From FIG. 14 a channel-like opening is formed by the semi-circular notches 76a and 110a, as indicated by reference numeral 180. Through this channel-like opening extends the electrical cable 56 shown in FIG. 2. It will also be appreciated that while conventional threaded bolt and threaded nut components have been illustrated for finally securing the neck portion 52 to the coupling recess 54, the bosses 140 and 142 could easily be formed with blind holes which accept self-tapping screws. In this manner separate threaded nuts would not be required. Also, only one threaded bolt and threaded nut could be used instead of a pair as shown in FIG. 13 if so desired without a significant loss of structural rigidity of the fully assembled apparatus 10.

The base assembly 16, intermediate coupling assembly 14 and handle assembly 12 are all preferably manufactured from a suitably high-strength plastic. An added feature of the construction of the coupling assemblies 44a and 44b is that suitably high-strength, rigid joints can be formed from plastics which might not otherwise be suitable for this purpose. For example, the string trimmer handle assembly 12, intermediate assembly 14 and base assembly 16 may all be formed from polypropylene, which is generally less rigid, but less costly, than ABS plastic, which would normally be required to provide suitable strength and rigidity for the string trimmer components. Accordingly, the construction of trimmer apparatus 10 of the present invention allows the plastic molded components of the invention to be constructed of less expensive plastics without sacrificing sturdiness, rigidity and general durability.

The coupling necks 46 and 52 and the coupling recesses 50 and 54 of the string trimmer 10 of the present invention thus allow the trimmer 10 to be quickly and easily assembled by a person of limited mechanical understanding and without the need for specialized tools which would not normally be available or kept on hand by individuals such as homeowners. Once assembled, the string trimmer apparatus 10 of the present invention forms a rigid assembly which is highly resistant to twisting and bending forces which might be experienced during use of the trimmer apparatus. The alignment ribs 94 and 128 and the grooves 170 and 166 further ensure that the user does not incorrectly assemble the string trimmer apparatus 10, since the coupling necks 46 and 52 can only be inserted into their associated coupling recesses 50 and 54 in one orientation. The ability to "knock-down" the string trimmer 10 prior to shipment and packaging, and the need for smaller boxes and other like shipping containers to enclose the string trimmer 10 prior to sale is therefore significantly reduced in view of the compact form which the string trimmer 10 takes when not assembled.

While the preferred embodiments of the present invention have been described in connection with a string trimmer, it will be appreciated that the teachings of the present invention could be adapted with little or no modification to virtually any hand-holdable tool or appliance. The teachings of the present invention are particularly applicable to any hand-holdable tool or appliance having an elongated body which requires a lengthy shipping container, or which would be more advantageously shipped in a knocked-down configuration.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A string trimmer apparatus for trimming vegetation, said apparatus comprising:

a handle assembly adapted to be held by an operator;

a base assembly;

an intermediate assembly coupled to said handle assembly and to said base assembly to form said trimmer apparatus; and said intermediate assembly including an upper end portion and a lower end portion, said upper end portion being adapted to engage with a lower portion of said handle assembly and said lower end portion being adapted to lockably inter-engage with an upper portion of said base assembly such that said handle assembly, said intermediate assembly and said base assembly form a rigid housing assembly when coupled together;

said intermediate assembly comprising a first intermediate half member and a second intermediate half member adapted to be secured together to form at least one coupling recess at one end portion thereof; and wherein at least one of said handle assembly and said base assembly includes a coupling neck adapted to matingly engage within said coupling recess to enable said intermediate assembly to be secured to said one of said handle assembly and said base assembly.

2. The apparatus of claim 1, wherein said coupling recess includes a forward boss member and a rearward boss member;

wherein said coupling neck includes a forward outer surface having a first countersunk portion and a rearward outer surface having a second countersunk portion; and said forward boss member being adapted to engage within said second countersunk portion in said rearward outer surface and said rearward boss being adapted to engage within said first countersunk portion in said forward outer surface when said coupling neck is slidably inserted in said coupling recess.

3. The apparatus of claim 2, wherein said forward outer surface of said coupling neck includes a bore aligned with said first countersunk portion and wherein said rearward outer surface includes a bore in alignment with said second countersunk portion in said rearward outer surface;

wherein said intermediate assembly includes a first bore in said forward boss member and a second bore in said rearward boss member; and said first and second bores in said intermediate assembly being longitudinally aligned with said bores in said coupling neck when said coupling neck is fully matingly engaged within said coupling recess such that a pair of external fastening members may be inserted through said first and second bores and said bores in said coupling neck to prevent withdrawal of said coupling neck from said coupling recess.

4. The apparatus of claim 3, wherein at least one of said coupling neck and said coupling recess includes a rib and wherein at least one of said coupling recess and said coupling neck includes a groove; and said rib and said groove operating to key said coupling neck and said coupling recess such that said coupling neck can only be inserted into said coupling recess in one orientation.

5. The apparatus of claim 1, wherein said upper end portion and said lower end portion of said intermediate assembly each include a coupling recess;

wherein said lower portion of said handle assembly includes a coupling neck adapted to be matingly, slidably engaged with said coupling recess at said upper end portion of said intermediate assembly; and wherein said upper portion of said base assembly includes a coupling neck adapted to be matingly, slidably engaged within said coupling recess at said lower end portion of said intermediate assembly.

6. An outdoor power tool comprising:

a handle assembly adapted to be held by an operator;

a base assembly for supporting a working implement of said power tool;

an intermediate assembly releasably coupled to said handle assembly and said base assembly to form said outdoor power tool, said intermediate assembly including upper and lower end portions, each one of said upper and lower end portions including a coupling recess;

said handle assembly and said intermediate assembly each including one of a coupling neck protruding therefrom and a coupling recess adapted to matingly receive said upper and lower end portions of said intermediate assembly during assembly of said outdoor power tool; and wherein each of said base and handle assemblies include said coupling neck, with each of said coupling necks being adapted to slidably, matingly engage within said coupling recesses.

7. The outdoor power tool of claim 6, wherein each of said coupling recesses includes at least one boss member protruding inwardly into its respective said coupling recess; and wherein each of said coupling necks include at least one recessed portion for receiving a respective one of said boss members to releasably retain its associated said coupling neck matingly within its associated said coupling recess.

8. A housing interconnection system for a power tool, said housing interconnection system comprising:

a handle assembly;

a tool supporting portion;

at least one of said handle assembly and said tool supporting portion including a neck portion protruding therefrom and having a recess formed thereon, and the other one of said handle assembly and said tool supporting portion having a coupling recess, said coupling recess including a boss member protruding into an area defined by said coupling recess;

said coupling recess being adapted to slidably, matingly receive said neck portion such that said boss member interlocks within said recess in said neck portion to releasably secure said handle assembly and said tool supporting portion together to form a multi-piece housing assembly;

said tool supporting portion includes a base assembly and an intermediate assembly;

at least one of said base assembly and said intermediate assembly including a neck portion protruding therefrom having at least one recess formed therein and the other one of said intermediate assembly and said base assembly including a coupling recess having at least one boss member protruding into an area defined by said coupling recess;

said coupling recess of one of said intermediate assembly and said base assembly being adapted to slidably, matingly receive said coupling neck of the other one of said intermediate assembly and said base assembly such that said boss member engages said recess to thereby releasably secure said coupling neck within said coupling recess, and thereby releasably secure said base assembly to said intermediate assembly;

said coupling recess associated with one of said intermediate assembly and said base assembly includes a second boss member protruding into said area defining said coupling recess a greater distance than said boss member;

wherein said neck portion formed on the other one of said intermediate assembly and said base member includes a second recess;

wherein said boss members engage within said recesses substantially simultaneously as said neck portion is slidably, matingly inserted into said coupling recess to thereby releasably secure said base assembly in said intermediate assembly together;

said base assembly comprising two half members, each said half member having a neck half integrally formed therewith; and said two half members of said base assembly being securable together to form a two-piece base assembly such that said neck halves form said neck portion.

9. An outdoor power tool comprising:

a handle assembly having first and second handle half members, said first handle half member having a first neck half integrally formed therewith and said second handle half member having a second neck half integrally formed therewith;

said first neck half further including an interior surface having a forward boss member and a rearward boss member protruding therefrom with said rearward boss member protruding a greater distance from said interior surface than said forward boss member;

said second neck half having a forward boss member and a rearward boss member protruding from an interior surface thereof with said rearward boss member protruding a greater distance from said interior surface than said forward boss member of said second neck half;

each of said forward and rearward boss members of said first neck half further including openings formed therein and a plurality of longitudinally aligned slots extending through said portions thereof;

said second neck half including a reinforcing rib extending longitudinally between said forward and rearward boss members thereof;

said first and second handle halves being securable together such that said forward boss member of said second neck half is received within said opening in said forward boss member of said first neck half, and said rearward boss member of said second neck half is received within said opening in said rearward boss member of said first neck half, and portions of said reinforcing ribs are received in said slots in said forward and rearward boss members of said first neck half such that said first and second neck halves form a rigid coupling neck when said first and second handle half members are secured together;

at least one of said first and second neck halves including a recess formed therein on an outer surface thereof;

said power tool including a tool supporting portion having an outer end including an upper coupling recess formed therein;

said upper coupling recess including an inner surface having at least one protruding portion; and said coupling neck of said handle assembly being adapted to be slidably, matingly inserted into said upper coupling recess such that said protruding portion within said upper coupling recess inter-engages with said recess formed on said outer surface of said coupling neck to releasably secure said handle assembly to said tool supporting portion.

10. The power tool of claim 9, further comprising:

a manually engageable power trigger disposed on said handle assembly;

an electrical cable electrically coupled to said power trigger and to a tool disposed within said tool supporting portion; and said coupling neck including an opening for enabling said electrical cable to pass through said coupling neck into said upper coupling recess.

11. The power tool of claim 9, wherein said tool supporting portion includes a base assembly and an intermediate assembly, said intermediate assembly including a lower coupling recess at one outer end thereof and said upper coupling recess at an opposite outer end thereof; and said base assembly including a coupling neck matingly insertable into said lower coupling recess to thereby form a multi-piece housing assembly when said base assembly, said intermediate assembly and said handle assembly are coupled together.

* * * * *